MAGNETIC RECORDING AND ANALYZING OF TRAFFIC OBSERVATIONS

Filed Oct. 18, 1954

INVENTORS J. W. DEHN
E. VROOM
BY
R. O. Covell
ATTORNEY

INVENTORS J. W. DEHN
E. VROOM
BY
R. O. Covell
ATTORNEY

MAGNETIC RECORDING AND ANALYZING OF TRAFFIC OBSERVATIONS

Filed Oct. 18, 1954

INVENTORS J. W. DEHN
E. VROOM
BY
R. O. Covell
ATTORNEY

INVENTORS J.W. DEHN
E. VROOM
BY
R. O. Covell
ATTORNEY

United States Patent Office 3,016,189

Patented Jan. 9, 1962

3,016,189

MAGNETIC RECORDING AND ANALYZING OF TRAFFIC OBSERVATIONS

Joseph W. Dehn, Great Neck, N.Y., and Edward Vroom, Brooklyn, Conn., assignors to Bell Telephone Laboratories, Incorporated, a corporation of New York Filed Oct. 18, 1954, Ser. No. 462,874
18 Claims. (Cl. 235—61.6)

This invention relates to telephone traffic observing and particularly to methods and means for recording traffic observations and for reading and analyzing traffic observation recordings.

In telephone systems and other types of switching systems, it is necessary to make frequent observations and studies of the flow of traffic through the system in order to determine if proper facilities are being provided. It is apparent that if the facilities are insufficient to carry the traffic load at any given period, service will suffer. On the other hand, it is equally apparent that it is uneconomical to provide an excess of facilities which will not be utilized during periods of light traffic. The optimum facilities to be provided are those which give the best possible service consistent with economy of operation and investment.

Traffic observations in telephone systems usually are made by observing the operation of certain key relays or circuits or combinations of relays or circuits in the system for a given period. Examples of the type of information obtainable during such observation periods on a trunk or a group of trunks include the total number of calls completed, number of calls lasting longer than a given number of seconds, number of calls lasting less than a given number of seconds, aggregate time a circuit or a given number of circuits were busy, total call seconds handled and the total number of times a certain relay was operated. This information is a direct measure of such factors as holding time and delay time in gaining access to certain equipment and furnishes a basis for making traffic and engineering studies to determine whether or not additional facilities should be provided.

In the past, when such traffic information was desired, it was necessary to have an observer note the duration of use of each circuit. Such observance was often found to be inaccurate due to the failure of the human factor and to be cumbersome and time consuming. Traffic and other such observations have also been made in the past by the use of a multipen recording instrument using a pen per circuit or a pen per function within a circuit. This has entailed considerable effort in analyzing and tabulating the data recorded by the pens on a paper tape. Furthermore, such devices, as the multipen recording instrument, are difficult and costly to maintain and oftentimes give unreliable information because of mechanical difficulties.

It is an object of the present invention to provide means for automatically recording wanted traffic data in a form which can be automatically read and analyzed.

Another object of the present invention is to provide an improved means for making and analyzing traffic data which is more economical and faster in operation than means presently used.

A still further object of the invention is to provide an improved traffic recorder capable of simultaneously recording traffic data in a plurality of circuits or devices and which is reliable in operation and economical to operate.

It is also an object of the present invention to provide an improved traffic data analyzer which automatically reads and analyzes records of traffic data, which is fast in operation, which is economical to operate and which is capable of simultaneously analyzing a plurality of traffic data records from a corresponding plurality of observed circuits.

The present invention comprises apparatus for automatically making a magnetic record of the time elapsing between occurrences of two successive events and apparatus for automatically reading and analyzing such records.

A feature of the present invention relates to circuits and apparatus for recording on a magnetic medium such as a magnetic wire, a magnetic tape or a magnetic drum, an alternating-current signal of known frequency during each interval of an observation period that a circuit under observation is in an operated condition. The embodiments of the invention disclosed herein utilize a magnetic tape. It is to be understood, however, that the invention is not limited to the use of a magnetic tape; any type of magnetic medium such as a magnetic wire or magnetic drum may be utilized.

A feature of the present invention also relates to the use of a vacuum tube gating amplifier for gating an alternating-current signal of known frequency to a recording head of a magnetic recorder during each interval of an observation period that a circuit under observation is in an operated condition.

Another feature of the present invention relates to the use of a magnetic gating amplifier for gating an alternating-current signal of known frequency to a recording head of a magnetic recorder during each interval of an observation period that a circuit under observation is in an operated condition. The embodiment of the invention disclosing this feature is particularly adapted to be used to make magnetic records of traffic data where the anode voltage sources required by a vacuum tube gating amplifier are not available.

A further feature of the present invention relates to circuits and apparatus controlled by a plurality of gating amplifiers for recording on a magnetic medium such as a magnetic wire, a magnetic tape or a magnetic drum, an alternating-current signal of known frequency during each interval of an observation period that a circuit under observation is in an operated condition.

Still another feature of the present invention relates to circuits and apparatus for recording traffic data in such a form that the records thus obtained may be subsequently automatically analyzed at a high rate of speed and in a number of ways.

A further feature of the present invention relates to circuits and apparatus for erasing a previously recorded alternating-current signal from a magnetic medium such as a magnetic medium such as a magnetic wire, a magnetic tape or a magnetic drum, during each interval of an observation period that a circuit under observation is in an operated condition. The embodiment of the invention which discloses this feature utilizes a so-called "negative recording" technique and is particularly adaptable for making traffic recordings at locations where a suitable source of alternating-current signal is inaccessible.

Another feature of the present invention relates to means for controlling a counting circuit by rectifying an amplified alternating-current signal read from a magnetic tape record and applying this rectified voltage to the counting circuit.

Still another feature of the present invention relates to the means for securing a gating signal from a magnetic medium and using this gating signal to control the input to a counter circuit.

Other features of the present invention relate to circuits and apparatus for automatically determining and registering the total time a circuit under observation has been in an operated condition during an observation period, the total number of times the circuit under observation has operated during an observation period, a distribution count of the number of times the circuit under observation was in an operated condition for various time intervals during an observation period, the number of times a circuit under observation was operated for a specific time interval during an observation period and the total time included between the beginning and end of the observation period.

These and other objects and features of the present invention may be more fully understood from the following description of preferred embodiments thereof when read with reference to the accompanying drawings in which.

Figures 4, 5:
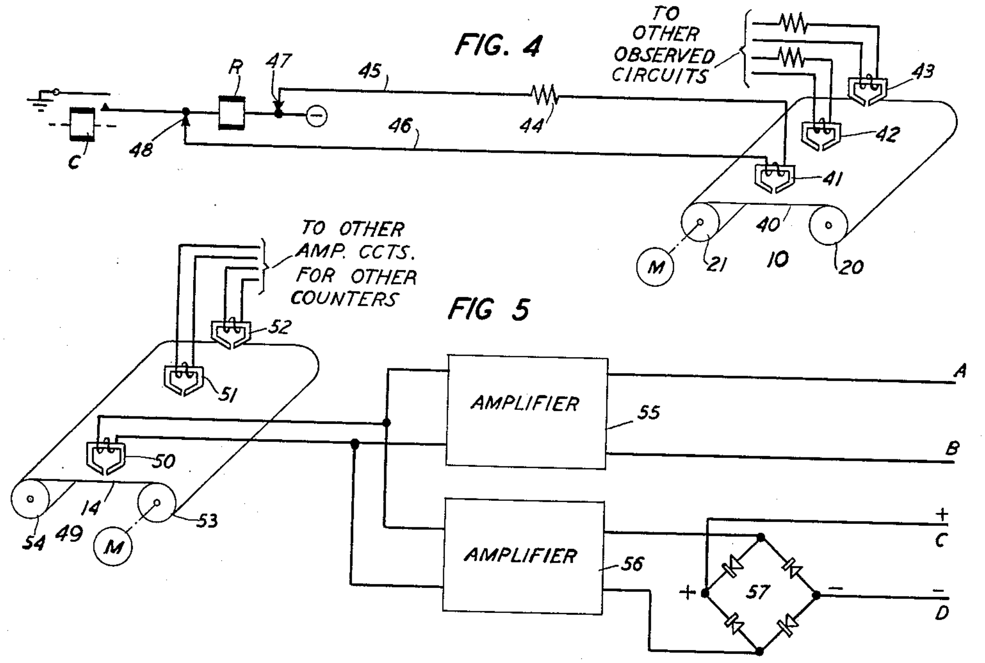
FIG. 4 shows an exemplary embodiment of the traffic recorder in accordance with the present invention which utilizes the "negative recording" technique to magnetically record traffic observations.
FIG. 5 is a schematic representation of the reading stage of an embodiment of the traffic data analyzer which is utilized to read and analyze the traffic data recorded by the traffic data recorders shown in FIGS. 1, 2 or 3.
Figure 8:
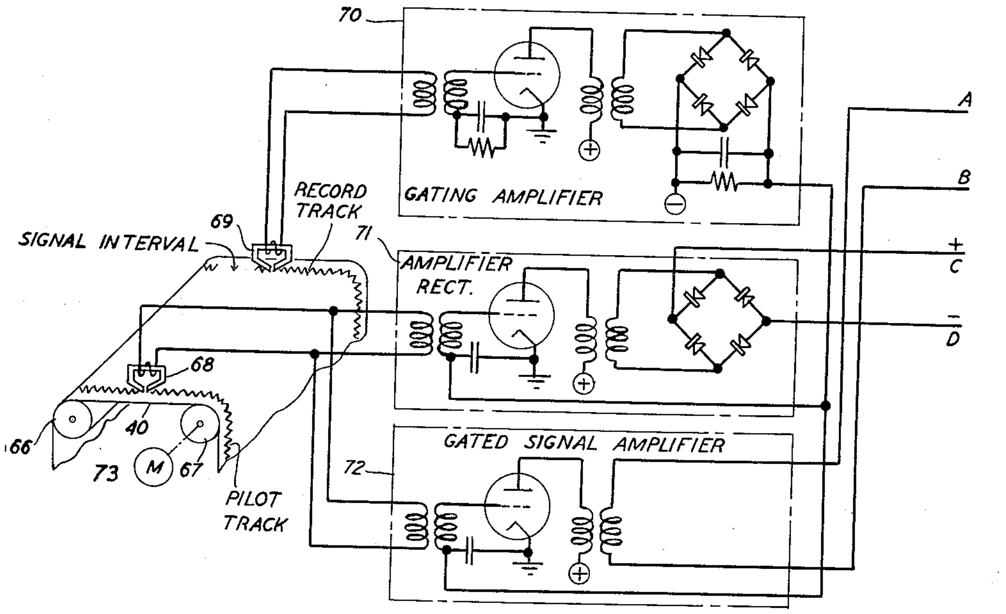
Figure 6:
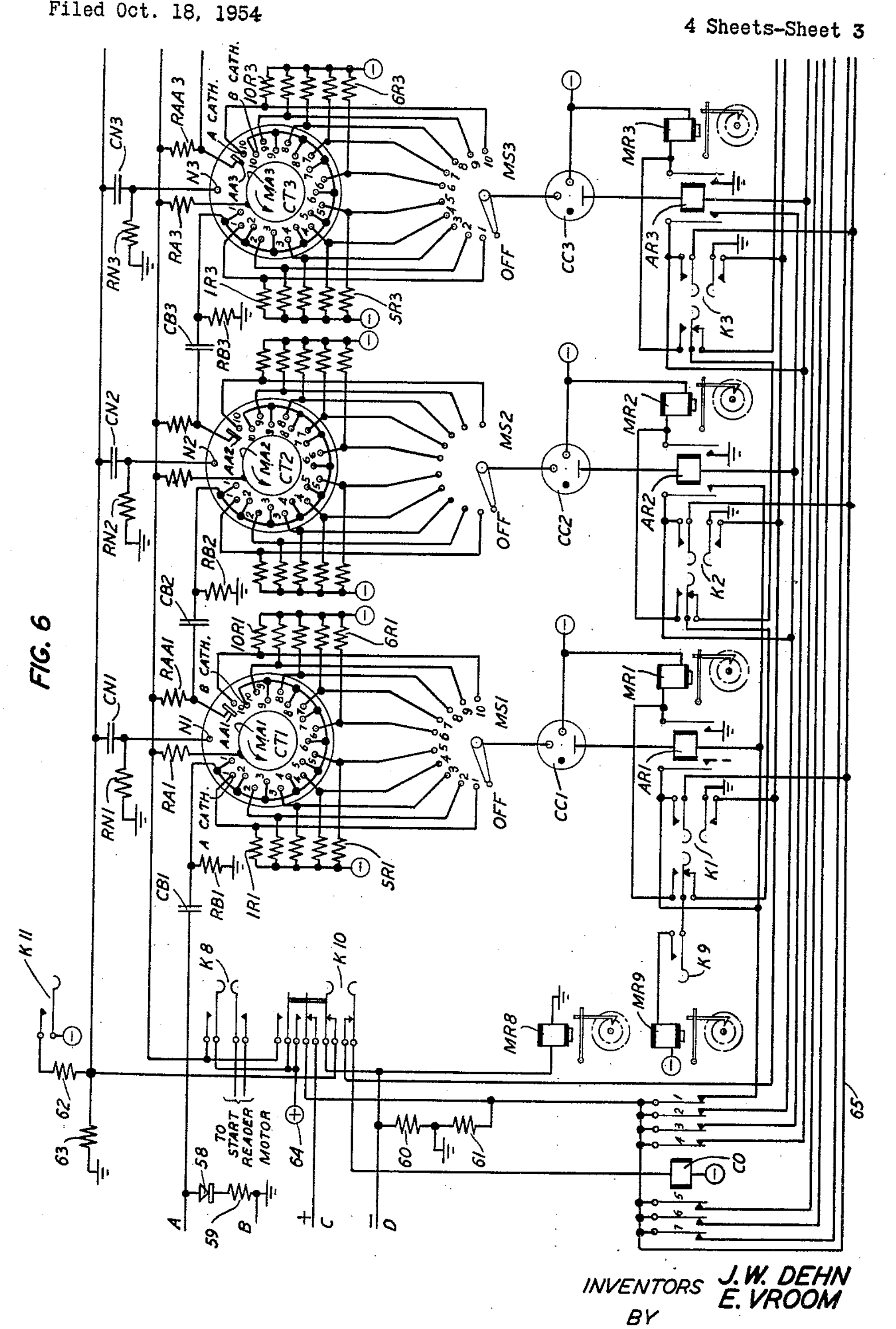
FIG. 6 shows a schematic diagram of the first three stages of the decade counter and the common control equipment which is utilized in the traffic data analyzer of the present invention.
Figure 7:
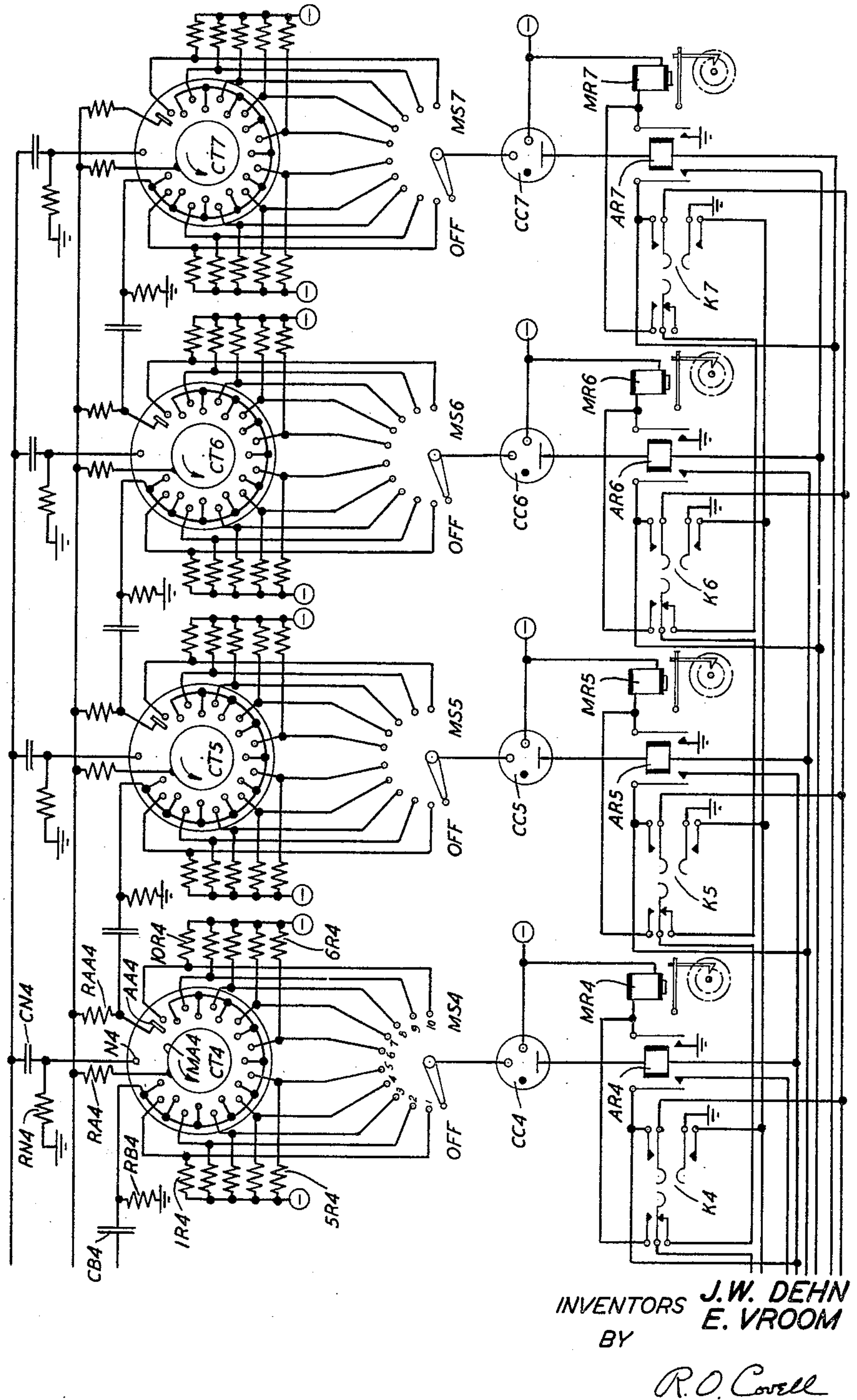

FIG. 7 shows a schematic diagram of stages 4, 5, 6 and 7 of the decade counter which, when combined with the circuits of FIG. 6, gives a complete schematic representation of the decade counting circuit used in the traffic data analyzer of the present invention; and FIG. 8 is a schematic representation of the reading stage of an embodiment of the traffic data analyzer which is utilized to read and analyze the data recorded by the traffic data recorder of FIG. 4.

According to one embodiment of the present invention, a gating amplifier is used to gate a signal from an alternating-current signal source of known frequency to the recording head of a magnetic recorder during each interval a circuit under observation is operated. The magnetic records thus produced consist of groups of cycles of the alternating-current signal, the length of each group being a measure of the time duration of each interval the circuit under observation was in an operated condition. The arrangement for analyzing these records consists of a magnetic reader which reads the alternating-current signals on the magnetic medium and sends a corresponding pulse per cycle into a decade counting circuit. The decade counting circuit counts the pulses received from the reader to determine the length of time of each such interval, to make a summation of the time in all such intervals during a period of observation, to make a summation of the number of such intervals in a period of observation, or to count the number of such intervals which are longer or shorter than a given time. For example, if a 1000-cycle per second alternating-current signal is recorded on the magnetic medium during each interval the circuit under observation is in an operated condition, each pulse received by the decade counter represents one millisecond and the intervals the circuit under observation was in an operated condition may be read and registered directly in milliseconds.

In accordance with another embodiment of the invention, a magnetic medium, upon which has previously been recorded a plurality of tracks of an alternating-current signal of known frequency, is fed through a magnetic erasing device. This erasing device erases the previously recorded alternating-current signal in one track of the medium during the interval a circuit under observation is in an operated condition. The arrangement for analyzing these records comprise two magnetic readers, one which reads the record track, that is, the track in which the previously recorded alternating-current signal was erased during each interval of operation of the circuit under observation, and the other which reads a pilot track on the same medium in which an identical signal has not been erased. The signals read from the record track are used to bias an amplifier connected to the reader of the pilot track so that a pulse per cycle is sent into a counting circuit only during the interval when no signal is recorded in the record track. This embodiment utilizes the same counting circuit described above to count the number of pulses received from the amplifier connected to the pilot track reader during the blank or erased intervals in the record track to determine the length of time of each such interval, to make a summation of the time of all such intervals during a period of observation, to make a summation of the number of such intervals in a period of observation, or to count the number of such intervals which are longer or shorter than a given time.

The traffic recorder and analyzer of the present invention is particularly adaptable for making traffic studies in telephone central offices. It is to be understood, however, that its use is in no way limited to telephone switching systems and that it may be utilized to make studies and analyzations of many other types of switching operations. One particular advantage in using the present invention to make traffic observations is that the records of operations may be taken at one locality and the automatic analyzing of these records performed at another locality. This will permit, in the telephone industry, for example, traffic studies and observations to be made at many remotely located offices and will permit the records of such studies and observations to be analyzed at a central point. Another distinct advantage of the traffic recoder and analyzer of the present invention is its accuracy and reliability. Its accuracy depends solely upon the alternating-current signal source used in recording the traffic observations which can be made quite stable. The speed of operation of the magnetic medium, whether it be a magnetic tape, a magnetic wire or a magnetic drum, is unimportant. Furthermore, the speed of recording on such mediums is entirely independent of the speed of reading such mediums. Therefore, it is possible to record the traffic data with the magnetic medium operating at one speed and to read the recorded data at a subsequent time at a much higher rate of speed, thus shortening the time required to read and analyze the recorded data. Once a magnetic record of traffic data has been made in accordance with the present invention, the same record can be read and analyzed many different times, a different type of analysis being made for each reading.

Figure 1:
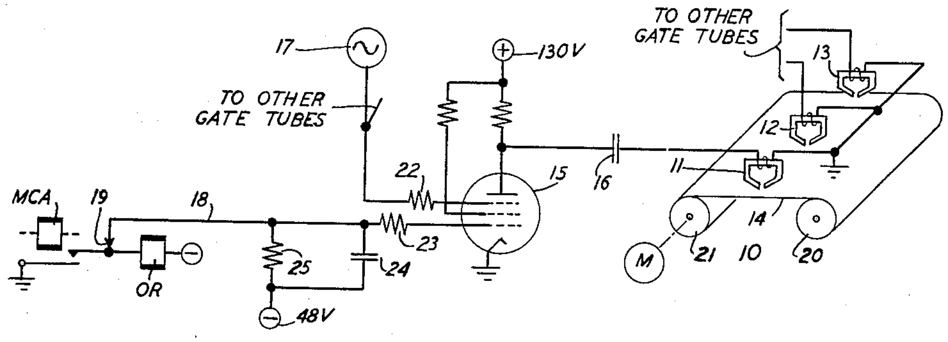
FIG. 1 shows an exemplary embodiment of a traffic recorder in accordance with the present invention which utilizes a vacuum tube gating amplifier to control the magnetic recording of traffic data.

Referring now to the drawings, the various exemplary embodiments of the present invention will be described in detail. FIG. 1 shows one exemplary embodiment of a traffic recorder in accordance with the present invention which may be utilized to magnetically record traffic observation data. This comprises a multihead magnetic tape recorder 10 having a plurality of recording heads situated adjacent to a magnetic tape 14. In the exemplary embodiment shown in FIG. 1, three recording heads 11, 12 and 13 are shown adjacently located to magnetic tape 14. It is to be understood that the invention is not limited to the use of three recording heads as any desired number can be utilized. Magnetic tape 14 is wound on spools 20 and 21 and is driven past the recording heads 11, 12 and 13 in the manner known in the art by motor M. Each of the magnetic recording heads is connected to an individual gating amplifier such as amplifier 15 which is connected to the recording winding of recording head 11 through condenser 16. Each of the gating amplifiers, such as amplifier 15 shown in FIG. 1, has its suppressor grid connected to a signal source 17 of known frequency. The frequency of source 17 may be, for example, 1000 cycles per second. This frequency, however, is not critical and is chosen for convenience only. Signal source 17 may provide a signal voltage having a sine wave, a square wave or a wave form of any convenient shape.

The control grid of gating amplifier 15 is connected through resistance 23 to a probe lead 18 which terminates in clip 19. Clip 19 is utilized to connect to the circuits or devices to be observed. Resistances 22 and 23 are current-limiting resistances for the suppressor grid and control grid, respectively, of amplifier 15. When the circuit or device under observation is unoperated, condenser 24 is discharged and probe lead 18 is at a minus 48-volt potential. Gating amplifier 15 is, therefore, biased below cutoff so that there is no conduction and there will be no signal recorded on the magnetic tape as it is driven past the recording head.

It is advantageous to have an "on" signal recorded in a track of the magnetic tape while the circuit under observation is in one condition and an "off" signal (or absence of signal) when the circuit under observation is in the other condition. In the exemplary embodiment of FIG. 1, the "on" signal is a 1000-cycle signal recorded in the track of the magnetic tape 14 by the corresponding recording head 11 as the tape 14 moves continuously past the recording head. Because the frequency of 1000 cycles has been selected as the "on" signal, each cycle recorded on the magnetic tape indicates that a one-millisecond time interval has elapsed and an accuracy of one millisecond in the timing of the operation of the circuit under observation is thereby obtained. If a greater degree of accuracy is desired, the frequency of source 17 may be increased.

When the circuit or device under observation operates, ground potential is applied to probe lead 18 through clip 19 and condenser 24 charges very rapidly so that the bias potential applied to the control grid of gating amplifier 15 is raised above cutoff and amplifier 15 conducts. Should there be any contact chatter or intermittent opening and closing of the ground applied to probe lead 18, condenser 24 will tend to discharge through resistance 25. The discharge time constant of condenser 24 is large as compared to its charging time constant and, therefore, condenser 24 will not discharge appreciably during this contact chatter. Thus, the bias of amplifier 15 is maintained above cutoff to prevent intermittent recording of the 1000-cycle signal on magnetic tape 14 which would indicate false operation and release of the circuit under observation. This has the effect of preventing the fine contact chatter of relays under observation from being recorded on tape 14.

In the exemplary embodiment shown in FIG. 1, probe lead 18 and clip 19 are shown connected to the OR relay of the marker circuit of a crossbar telephone switching system. The OR relay in this case is the relay under observation. When the OR relay is normal and in its unoperated condition, probe lead 18 is at minus 48-volts potential and gating amplifier 15 is cut off. However, when the OR relay is operated by the operation of MCA relay shown in FIG. 1, probe lead 18 is at ground potential and the gating amplifier 15 delivers a 1000-cycle signal to the winding of recording head 11. This 1000-cycle signal will be continuously recorded on tape 14 by recording head 11 as long as the OR relay remains in its operated condition. When OR relay releases, gating amplifier 15 is again cut off and the recording of the 1000-cycle signal from source 17 on tape 14 is halted.

Traffic data on the operation of a plurality of circuits may be made simultaneously by the traffic recorder shown in the exemplary embodiment of FIG. 1. By increasing the size of magnetic tape 14 and correspondingly increasing the number of recording heads and associated gating amplifiers, a large number of circuits may be simultaneously observed.

Figure 2:
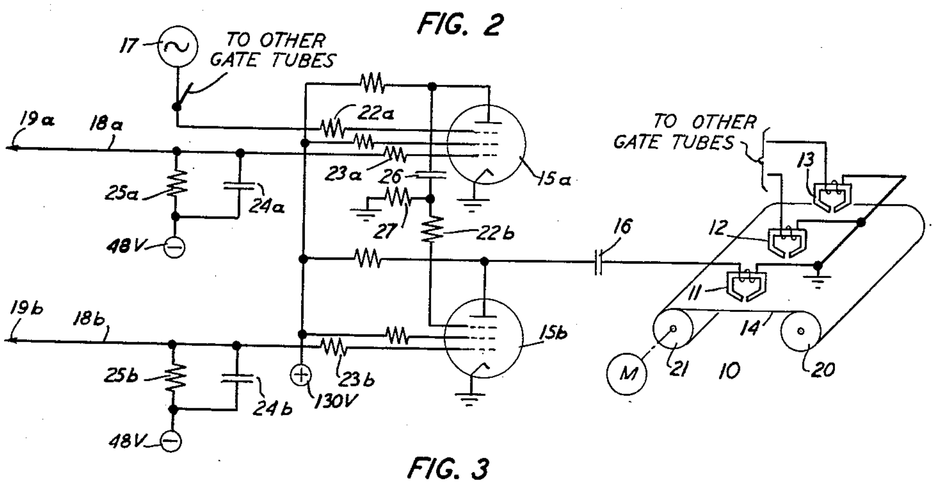
FIG. 2 shows an exemplary embodiment of a traffic recorder of the present invention which utilizes a plurality of gating amplifiers to control the magnetic recording of traffic data.

In some cases, it may be advantageous to control the recording by means of more than one probe. FIG. 2 of the drawings shows an exemplary embodiment of a traffic recorder using two gating amplifiers and associated probes and clips. The numerical designations of the various elements of the traffic recorder shown in FIG. 2 correspond to the elements shown in FIG. 1. Gating amplifiers **15*a* and 15*b* operate in a manner similar to that described above in connection with FIG. 1. The 1000-cycle output from amplifier 15*a* when conducting is applied through condenser 26 to the suppressor grid of amplifier 15*b*. Therefore, only when amplifiers 15*a* and 15*b* are both conducting will a 1000-cycle signal be recorded on magnetic tape 14. By connecting clips 19*a* and 19*b* to the circuit or device to be observed in the desired manner, the 1000-cycle signal will not be recorded on tape 14 by recording head 11 until both gating amplifiers 15*a* and 15*b* are rendered conductive by a ground being applied to both probe leads 18*a* and 18*b***.

Many other combinations of gating amplifiers may be devised as required. A complete recording device in accordance with the present invention would be provided with sufficient numbers of the various types of gating amplifier circuits all flexibly arranged so that any desired combination of conditions could control the "on" signal for a particular track and so that any number of simultaneous observations could be made.

Figure 3:
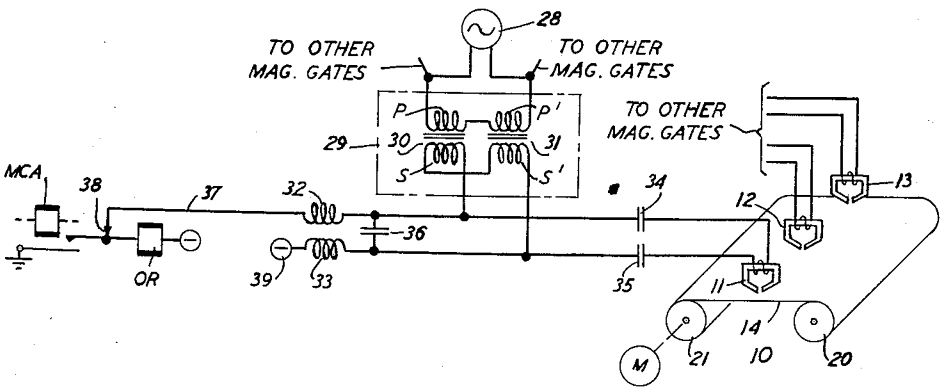
FIG. 3 shows an exemplary embodiment of a traffic recorder in accordance with the present invention which utilizes a magnetic gating amplifier to control the magnetic recording of traffic data.

FIG. 3 shows another exemplary embodiment of a traffic recorder in accordance with the present invention which may be utilized to magnetically record traffic observation data. The exemplary embodiment shown in FIG. 3 comprises a multi-head magnetic tape recorder similar to that disclosed in FIGS. 1 and 2. Each of the magnetic recording heads 11, 12 and 13, instead of being connected to a vacuum tube gating amplifier as in FIG. 1, is connected to a magnetic gating amplifier such as magnetic gating amplifier 29 connected to recording head 11. The magnetic gating amplifier 29 comprises a pair of identical saturable cores 30 and 31. Cores 30 and 31 have input windings P and P′, respectively, and output windings S and S′, respectively. Windings P and P′ are identical windings and are connected in series with an alternating-current voltage source 28 of known frequency. The magnitude of the alternating-current input voltage to windings P and P′ is great enough to drive the cores to saturation on each half-cycle. Output windings S and S′ of cores 30 and 31, respectively, are identical and are connected so that their respective output voltages are in opposition making the net output therefrom zero when no direct current is flowing through these windings. When a direct current from source 39 flows through output windings S and S′, a bias flux is established in each of the cores 30 and 31. Because the alternating-current input will saturate the cores on each half-cycle, the direct-current bias aids the positive half-cycle in the input windings in one core and the negative half-cycle in the other core. The effect of the direct-current bias flowing through the output windings of cores 30 and 31 prevents the output voltage cancellation which was obtained with no direct current and gives a resultant output which contains even harmonics of the input voltage from source 28. Condensers 34 and 35 are blocking condensers to prevent the direct current from source 39 from flowing through recording head 11. Inductances 32 and 33 offer a high impedance to the alternating current developed at the output windings S and S′ to prevent this alternating current from being dissipated through the potential source 39. Inductances 32 and 33 in parallel with condenser 36 are selected so as to be antiresonant at the desired even harmonic frequency of the output voltage. This has a tendency to suppress the higher harmonics in the output and to enhance the desired even harmonic frequency. Therefore, if it is desired to record a 1000-cycle signal on magnetic tape 14 during the time the circuit under observation is operated, an alternating-current voltage having a frequency of 500 cycles per second would be utilized in source 28 and an output second harmonic of 1000 cycles per second will be applied to the recording winding of recording head 11 during the operate time.

As shown in FIG. 3, probe lead 37 is connected to inductance 32 and terminates in clip 38 which is utilized to connect to the circuit to be observed. The OR relay of a marker circuit of a cross-bar telephone switching system is shown in FIG. 3 as the relay under observation. When MCA relay operates, ground will be applied to the left-hand terminal of the winding of OR relay to operate this relay. Simultaneously, ground will be applied to probe lead 37 and a path for direct current from battery 39 is closed through the output windings S and S' of cores 30 and 31, respectively. Therefore, assuming that alternating-current voltage source 28 provides a 500-cycle signal voltage in the input windings P and P' of cores 30 and 31, respectively, a 1000-cycle signal will be recorded on magnetic tape 14 during the time OR relay is operated.

Still another exemplary embodiment of a traffic recorder in accordance with the present invention is illustrated in FIG. 4. It utilizes a so-called "negative recording" technique to record traffic observations. This embodiment comprises a multihead magnetic tape recorder 10 having a plurality of erasing heads 41, 42 and 43 situated adjacent to a magnetic tape 40. It is to be understood that the exemplary embodiment shown in FIG. 4 is not limited to the use of three erasing heads and that any desired number may be utilized. Magnetic tape 40 is wound on spools 20 and 21 and driven past the erasing heads 41, 42 and 43 in the manner known in the art by motor M. Magnetic tape 40 is a tape upon which has previously been recorded a plurality of tracks of an alternating-current signal of known frequency. Following the example utilized above, assume that a 1000-cycle signal is recorded in each track on tape 40 for each of the heads 41, 42 and 43 shown on the recorder. Each of the magnetic erasing heads is connected to a resistance, such as resistance 44 connected to erasing head 41, and to two probe leads 45 and 46 which terminate in clips 47 and 48, respectively. Clips 47 and 48 are utilized to connect to the circuit or device to be observed.

As shown in FIG. 4, clips 47 and 48 are connected in parallel with the winding of relay R which is the relay under observation. When relay C operates completing a circuit for the operation of relay R, a direct-current path is completed from ground through clip 48, over probe lead 46, through erasing head 41, through resistance 44, through probe lead 45, through clip 47 to battery, thus energizing the erasing head 41. Therefore, instead of recording a 1000-cycle signal on a magnetic tape during the time the circuit under observation is operated, the embodiment disclosed in FIG. 4 erases a previously recorded 1000-cycle signal in a track on a magnetic tape during the time the circuit under observation is operated.

FIGS. 5, 6 and 7 show an exemplary embodiment of a traffic data analyzer which automatically reads and analyzes the records of traffic data recorded by the magnetic recorders shown in FIGS. 1, 2 or 3. The records on the magnetic tapes made by these recorders consist of groups of 1000-cycle signals, the length of each group being equivalent to the time the relay or device under observation was in an operated condition for each operated interval. As described above, these records may be simultaneously made for a plurality of observed circuits or for a single observed circuit. The traffic data analyzer disclosed in FIGS. 5, 6 and 7 shows only the circuits and devices necessary for reading and analyzing a magnetic record made for a single observed circuit. These circuits and devices are, however, sufficient to disclose the principles for a traffic data analyzer which could be utilized for simultaneously reading and analyzing a plurality of such records, a plurality of the circuits shown in FIGS. 5, 6 and 7 being necessary to simultaneously read and analzye a plurality of records.

Briefly stated, the traffic data analyzer disclosed in FIGS. 5, 6 and 7 comprises a magnetic reading stage shown in FIG. 5 which reads the alternating-current signals recorded on the magnetic tape and sends a pulse per cycle into a decade counting circuit shown in FIGS. 6 and 7. As assumed above, a 1000-cycle signal was recorded on the tape during the interval that the relay or device under observation was in an operated condition. This frequency is exemplary only and a lower or a higher frequency within the limits of performance of the counters can be employed with proper multiplying factors applied to the results obtained. The decade counter disclosed in FIGS. 6 and 7 consists of seven stages capable of counting from one millisecond to 10,000 seconds. It is further to be understood that this embodiment of the invention is not limited to a seven stage decade counter and that any desirable number of stages can be added in tandem to the seven stages disclosed or a fewer number of stages can be employed if desired.

The reading stage shown in FIG. 5 consists of a multihead magnetic tape recorder 49 having a plurality of reading heads 50, 51 and 52. Magnetic tape 14, upon which has been recorded magnetically the traffic data to be read and analyzed, is wound on spools 53 and 54 and is driven past reading heads 50, 51 and 52 in the manner known in the art by motor M. Each of the magnetic reading heads 50, 51 and 52 is connected to an amplifier 55 which boosts the energy from the head to pulse or step the counting tubes of the decade counter. The output of amplifier 55 is aplied to the seven stage decade counter over leads A and B as will be described hereinafter. Also bridged across the output of each reading head is an amplifier 56, the output of which is applied to a full-wave rectifier 57. The output of rectifier is applied over leads C and D to the seven stage decade counter and will, as described hereinafter, serve the dual purpose of providing the priming pulse of the stepping tubes of the decade counter circuit and providing anode power for the cold cathode triodes. Because rectifier 57 can have an output only while it is receiving an input from the reading head 50 through amplifier 56, it acts as a gate and permits the counting tube to start and allows the cold cathode tubes to be fired only while pulses are to be counted and extinguishes them when the pulses cease. Amplifiers, such as amplifiers 55 and 56 and rectifiers, such as rectifier 57, will also be connected to magnetic reading heads 51 and 52 when it is desired to simultaneously read and analyze more than one track of recorded data or the magnetic tape 14.

The output of amplifier 55 is applied over leads A and B across varistor 58 and resistance 59 shown in FIG. 6. Varistor 58, which is a unidirectional current-conducting device, is poled so that the positive half-cycles of the output from amplifier 55 are shunted to ground through resistance 59 and only the negative half-cycles of the pulse are applied to the first stage of the decade counter circuit through condenser CB1. The negative output from rectifier 57 is applied over lead D to the upper terminal of resistor 60 shown in FIG. 6 while the positive output from rectifier 57 is applied over lead C through a normal contact of switch K10 to the lower terminal of resistor 61. Thus, resistors 60 and 61, which have their common points connected to ground, are bridged across the output of rectifier 57 and provide a reference to ground for the positive and negative potentials.

Each stage of the decade counter shown in FIGS. and 7 employs a multicathode stepping tube. Such a tube, operable in a suitable manner, is disclosed in Patent 2,635,810 granted April 21, 1953 to M. A. Townsend.

The stepping tube in each stage of the counter comprises a plurality of A cathodes, a plurality of B cathodes, a normal cathode N, an auxiliary anode AA and a main anode MA. The A and B cathodes are mounted in a circular array with each A cathode interposed between two B cathodes. The main anode MA is ring-shaped and supported in spaced relation with the A and B cathodes. The A cathodes are termed "rest" or "load" cathodes while the B cathodes are termed "transfer" cathodes. The normal cathode N is positioned beneath the row of A cathodes and adjacent a B transfer cathode. The auxiliary anode AA is positioned adjacent one of the rest or load cathodes A. As each stepping tube comprises ten stepping sections, the N cathode will be adjacent to cathode B1 and the auxiliary anode AA will be adjacent to cathode A10. Each of the rest cathodes A is connected in series with a resistor to a negative source of potential. For example, the A1 cathode of stepping tube CT1 in the first stage is connected through resistance 1R1 to negative battery and the A10 cathode of tube CT1 is connected through resistance 10R1 to negative battery. Anode potential for the main anode MA of the stepping tube is supplied through a current-limiting resistance such as resistance RA1 for the main anode MA1 of tube CT1. Similarly, the anode potential for the auxiliary anode AA is supplied through a current-limiting resistance such as resistance RAA1 for auxiliary anode AA1 of tube CT1.

To "zero" or "prime" the stepping tube for starting a count, negative potential is applied to the normal cathode. This potential is applied in each of the stages of the counter through a condenser and developed across a resistance. For example, the negative voltage applied through condenser CN1 develops a negative pulse across resistance RN1 which is applied to normal cathode N1 of tube CT1 in stage one of the decade counter. The pulses to be counted by the decade counter are applied through a condenser and developed across a resistance to the B cathodes of each stepping tube. For example, the negative pulses are applied through condenser CB1 which develops across resistance RB1 corresponding negative pulses which are applied to the B1 cathode of tube CT1 in the first stage of the counter.

Reference may be made to the above-cited Townsend patent for a complete description of the theory of operation of the stepping tubes utilized in the decade counter of the present invention which briefly is as follows. The priming of a stepping tube such as tube CT1 by the application of negative potential to its normal cathode N1 causes a discharge to be initiated between the normal cathode N1 and the main anode MA1. When the first negative pulse to be counted is applied to the B1 cathode, this discharge is transferred to the B1 cathode. When this negative signal pulse subsides, the discharge is then transferred to the A1 cathode which is normally more negative than the B1 cathode. The disposition of the electrodes in the tube is such that the discharge transfers or steps in the direction indicated by the arrow with the application and cessation of succeeding negative pulses to the B cathodes. The discharge will continue to step around until the negative pulses cease to be applied to the B cathodes. When the pulses cease and the discharge rests on an A cathode, an output voltage can be derived across the series resistance connected thereto. For example, if the discharge rests on the A7 cathode of tube CT1, a voltage will be developed across resistance 7R1 which is applied to contact 7 of manual switch MS1. When the discharge reaches the tenth A cathode, that is, cathode A10, a discharge is initiated to the auxiliary anode AA which generates a negative pulse through condenser CB2 and across resistance RB2 to start a discharge in the stepping tube in the succeeding stage of the counter. When the pulse ceases, the discharge in the stepping tube rests on one of the A cathodes therein to which it has been pulsed. If a new normalizing potential is supplied to the normal cathode N1, the discharge which exists between the main anode MA1 and any of the A cathodes will immediately be transferred to the normal cathode N1 and the tube CT1 is thereagain prepared to initiate a new count. As long as no new normalizing potential is supplied to the normal cathode of the stepping tube, successive negative pulses will cause the discharge to be stepped from cathode to cathode around the tube in successive steps as negative pulses are received.

Associated with the stepping tube in each stage of the decade counter is a manual switch having ten active contacts corresponding to the ten load cathodes A of the stepping tube. For example, manual switch MS1 is associated with stepping tube CT1 in stage one of the counter. Each of the contacts of the manual switch which are numbered 1 to 10 is connected to the series resistance between the negative battery and the corresponding A cathode of the stepping tube. Therefore, when a discharge is initiated through the A cathode, a potential will be applied to the corresponding contact on the manual switch MS1. An open position contact is also provided on each of the switches in addition to the ten active points.

Each stage of the decade counter also is equipped with a cold cathode triode, the cathode of which is connected to the movable arm of the manual switch. The anode of the cold cathode triode is connected to a fast operate relay. For example, cold cathode triode CC1 is connected to the movable arm of manual switch MS1 and the anode of tube CC1 is connected to the winding of relay AR1. The AR relay in each stage of the counter operates an associated mechanical register such as register MR1 for stage one. Thus, if manual switch MS1 is set to the fifth position, for example, and a discharge is initiated between load cathode A5 and main anode MA1 in tube CT1, cold cathode tube CC1 will have a discharge initiated in it which in turn will cause the operation of relay AR1 and mechanical register MR1.

Each of the AR relays associated with the seven stages of the decade counter disclosed in FIGS. 6 and 7 also has contacts in a chain circuit extending over the seven stages of the counter and each has associated therewith a key such as key K1 for stage one so that the chain circuit can be arranged to cover from one to seven of the AR relays. Connected to this chain circuit is a mechanical register MR9 and associated key K9 which may be utilized as will be described hereinafter to give an indication when a certain specific predetermined count has been reached by the decade counter circuit. Mechanical register MR8 is shown connected to lead D and will operate once for each group of 1000-cycle signals recorded on the tape, thus giving an indication of the number of times that the circuit or device under observation operated during the observation period.

Mechanical registers MR1 through MR9, shown in FIGS. 6 and 7, are arranged in the manner known in the art for either a manual reset or electrical reset to zero. These registers may, therefore, be reset to zero at the start of each new analyzing operation.

The CO relay shown in FIG. 6 furnishes the anode potential for the cold cathode triodes of the various stages of the decade counter through its normal contacts. Relay CO may be operated by any one of the keys K1 through K7 of the various stages of the decade counter as will be described hereinafter. Key K8 is a start key which supplies positive potential to the main anode and auxiliary anode of each of the stepping tubes of the seven stages of the counter. Key K8 also completes a circuit for operating the driving motor M to drive the tape of the magnetic reader. Key K11 is a priming key which, when operated, supplies a negative potential through a voltage divider comprising resistances 62 and 63 to manually prime the stepping tubes of the counter. Key K10 is a transfer key which is utilized to connect a local positive potential source 64 to the cold cathode triodes CC1 through CC7 as will be described hereinafter.

The operation of the traffic data analyzer shown in FIGS. 5, 6 and 7 will now be described for a few typical examples. Assume that the traffic recorder of FIGS. 1, 2 or 3 has recorded a 1000-cycle signal on magnetic tape 14 during each interval of an observation period that a relay such as the OR relay shown in FIG. 1 was in an operated condition. Therefore, the record on tape 14 comprises a plurality of groups of 1000-cycle signals corresponding in number to the number of intervals that relay OR was in an operated condition. Furthermore, the length of each group, that is, the number of cycles in each group, will be a measure of the time duration of each interval. Assume further that simultaneously with the recording of the intervals of operation of the OR relay on tape 14 that another simultaneous recording was made on tape 14, for example, by recording head 12 shown in FIG. 1 which recorded a 1000-cycle signal on tape 14 continuously from the start to the termination of the observation period. This record will, therefore, give an accurate measure of the time duration of the observation period.

By placing tape 14 in the traffic data analyzer such as shown in FIGS. 5, 6 and 7, several different types of information may be obtained from the record tape. Generally, it will be of interest to know the total time which elapsed from the start to the finsh of the observation period. Because a separate continuous 1000-cycle track was recorded on tape 14 as assumed above, it is, therefore, only necessary to count the number of cycles in this track in order to obtain the desired information. The tape may be run through the traffic data analyzer of FIGS. 5, 6 and 7 in an independent operation or this information may be secured concurrently with information recorded on other tracks of the magnetic tape. This, of course, contemplates the use of multitrack tape in a traffic data analyzer having a plurality of reading heads and counting circuits. The operation of the traffic data analyzer will be described for individual operations. Some of these operations, however, may be made simultaneously by the use of a multichannel data analyzer.

The operating procedure for determining the total number of milliseconds elapsing from the start to the finish of an observation period is as follows. Insert tape 14 in the reading stage shown in FIG. 5 so that the continuous 1000-cycle track recorded on the tape from the start to the finish of the observation period is under one of the reading heads, such as reading head 50. Set all the manual switches MS1 through MS7, shown in FIGS. 6 and 7, to their respective off positions. Set all the mechanical counters MR1 through MR9 to their respective zero positions. Check to determine that keys K1 through K7 and K9 are in their normal unoperated positions. Operate key K10 which connects a positive potential from local source 64 through the normal contacts of CO relay to the cold cathode triode tubes CC1 through CC7 of the counting circuit and provides anode potenial through a front contact and armature of key K10 to the main anodes and auxiliary anodes of each of the counting tubes CT1 through CT7. The positive potential for the operation of the cold cathode triodes CC1 through CC7 is normally obtained from rectifier 57 over lead C through normal contacts of key K10. The operation of key K10, therefore, makes the operation of the cold cathode triodes CC1 through CC7 independent of any output from rectifier 57. Operate key K11 to momentarily prime the counting tubes CT1 through CT7. Key K11, in operating, applies a negative potential to the normal cathodes of each of the stepping tubes CT1 through CT7. Normally, this normalizing potential is supplied through normal contacts of unoperated key K10 from the negative output of rectifier 57 over lead D. The priming of the counting tubes CT1 through CT 7 through the operation of key K11 renders the operation of the counting tubes independent from the output of rectifier 57 and prevents the counting tubes CT1 through CT7 from recycling or returning to normal should there be a break in the signal read from the tape 14. Operate start key K8. Start key K8, in operating, energizes motor M which commences to drive tape 14 past the reading head 50. The 1000-cycle alternating-current signal recorded in tape 14 will, therefore, be read and applied through amplifier 55 to leads A and B. Each cycle of this alternating-current signal will cause the negative pulse to be applied to the B cathodes of counting tube CT1. As described above, these pulses will cause the discharge to step around from cathode to cathode in the counting tube CT1 and when the tenth pulse is received, a negative pulse will be applied to the B1 cathode of counting tube CT2. Thereafter, the discharge in tube CT1 will continue to step from cathode to cathode and as each tenth pulse is received a pulse will be applied to tube CT2. This stepping action continues in all of the tubes CT1 through CT7 until the negative pulses cease to be received. When there are no more pulses on the record, thus indicating the end of the observation period, each of the counting tubes CT1 through CT7 will have a discharge from one of its A cathodes to its main anode as described hereinbefore. This assumes, of course, that a sufficiently high number of pulses were received to extend to the range of all of the tubes. Counting tubes CT1 through CT7 are designed in such a way that the location of these discharges will be visible and the count may be read directly from the tubes. The total count may also be read by advancing each of the manual switches MS1 through MS7 slowly over their respective contacts until the cold cathode triode tubes CC1 through CC7 fire. The position of the movable arm of the master switch when this occurs is an indication of the values to be read from the respective stages of the decade counting circuit.

If it is desired to obtain the total or cumulative count of the number of milliseconds that relay OR was in an operated condition during an observation period, the procedure would be identical to that described above except that the proper track on the tape would be read. In other words, as assumed above, to determine the total number of milliseconds the OR relay shown in FIG. 1 was operated during the observation period, the track of tape 14 which recorded the time intervals that the OR relay was operated would be placed under a reading head such as head 50 shown in FIG. 5 and the traffic data analyzer operated in the manner described above.

Information for plotting a curve of duration of operated time versus number of times operated for the OR relay may be obtained in the following manner. Place tape 14 in the reader so that the track in which the operation intervals of relay OR are recorded is under a reading head such as head 50. Set all the manual switches MS1 through MS7 to their respective tenth points. Set key K10 to normal. Operate the start key K8. The operation of start key K8 at this time in addition to energizing motor M to drive tape 14, applies a positive potential from source 64 to the main anode and auxiliary anode of each of the counting tubes CT1 through CT7. Each group of the alternating-current signals read by reading head 50 will be applied through amplifier 56 and rectified by rectifier 57 as described above so that a positive potential is applied through the normal contacts of relay CO to the cold cathode triode tubes CC1 through CC7, and a negative potential is applied through the normal contacts of key K10 to the normal cathodes of the counting tubes CT1 through CT7 to prime these tubes. As described above, each cycle of the alternating-current signal read by reading head 50 will be applied to amplifier 55, the output of which is fed over leads A and B to varistor 58 and resistance 59. The negative half-cycles are applied through condenser CB1 as negative pulses to the B cathodes of counting tube CT1. The discharges in the counting tubes CT1 through CT7 will be stepped around the tubes in the manner described hereinbefore. When this discharge reaches the tenth A cathode, that is, cathode A10 in each of the counting tubes, this discharge will, in the manner described above, cause the associated cold cathode triode to fire and operate the associated AR relay. The operation of the AR relay will in turn cause the operation of the associated mechanical counter. For example, when the tenth pulse is received by counting tube CT1, a discharge is initiated through cold cathode triode CC1 which causes the operation of relay AR1. Relay AR1, in operating, operates mechanical register MR1. When any of the cold cathode triodes CC1 through CC7 fire, they remain locked in and hold their associated AR relays and mechanical counters operated for the duration of the particular group of 1000 cycles which represents the length of time the circuit under observation (which, under this assumed condition is the OR relay) remained in an operated condition for that interval. When the 1000-cycle signals cease to be read by reader 50, there will be no rectified output from rectifier 57 to supply anode power to the cold cathode triodes and their discharges will be extinguished which will release the associated AR relays and mechanical registers. In addition, mechanical register MR8 is operated once during each interval of the reception of pulses from magnetic tape 14.

When tape 14 has been run through the reader, each mechanical register MR1 through MR7 will operate once for each operation of its associated AR relay whenever ten pulses have been counted by their respective counting tubes. Therefore, at the end of the run, mechanical register MR1 will indicate the number of times the OR relay was operated for ten milliseconds or longer, MR2 will indicate the number of times the OR relay was operated for 100 milliseconds or longer, MR3 will indicate the number of times the OR relay was operated for 1000 milliseconds or longer, etc., etc., to MR7. At the same time, MR8 will indicate the total number of times the OR relay operated during the entire observation interval. This data will be sufficient to plot a distribution curve. If it is desired to obtain more points for the curve, for example, between 100 and 1000 milliseconds, several more runs could be made with the manual switch MS3 set on points lower than ten. Thus, it is possible by making ten runs of the tape to get data for each of the ten positions of manual switch MS3 representing steps of 100 milliseconds.

When it is desired to determine how many times relay OR was operated for a specific time, for example, 555 milliseconds during the observation period, place tape 14 in the reader so that the track in which the operation intervals of relay OR are recorded is under a reading head such as head 50, operate manual switches MS1, MS2 and MS3 to their respective number 5 contacts, operate key K1 to its left position, operate key K3 to its right position, set key K10 to its normal or unoperated position, operate key K9 and operate start key K8. It will be noted that key K3, when operated to its right position, causes the operation of relay CO which cuts off the normal anode voltage supplied to the anodes of the cold cathode triodes CC1 through CC7 obtained from the output of rectifier 57. Key K3, in operating, however, will supply positive potential from over conductor 65 for the anode of cold cathode triode CC3 when a positive output is being received from rectifier 57. The alternating-current signal recorded on tape 14 will be read in the manner described before and applied to the counting tubes of the decade counter. When 500 pulses have been received, counting tube CT3 will cause cold cathode triode CC3 to fire and operate relay AR3. The operation of relay AR3 now supplies anode potential over lead 65 for cold cathode triode CC2 which will cause CC2 to fire when 50 more pulses have been received. When tube CC2 fires, relay AR2 will operate and extend the anode potential of conductor 65 to cold cathode triode CC1 which will fire when 5 more pulses have been received. When cold cathode triode CC1 fires, upon the reception of the additional 5 pulses, relay AR1 operates and causes the operation of mechanical register MR9. The operation of register MR9 registers the number of times relay OR was held operated for 555 milliseconds or longer. When the signals cease to be received from tape 14, during an interval when the OR relay was in an unoperated condition, the positive potential from rectifier 57 ceases and the cold cathode triodes CC1 through CC7 restore to normal. The discharges in the counting tubes CT1 through CT7 will rest on the cathode to which they were last stepped at the end of the operate interval. However, the resumption of a signal read from tape 14 indicating the reoperation of the OR relay, will reprime counting tubes CT1 through CT7 by means of the normalizing negative potential from rectifier 57 over conductor D and the counting tubes will reset and start from zero at the beginning of the next signal interval. Thus, the counting tubes will start counting from zero at the beginning of each interval of operation of the OR relay.

If it is desired to determine the number of times the OR relay was held operated for a much longer time than 555 milliseconds, for example, 55 seconds and the shorter times such as the units, tens and hundreds of milliseconds are not of interest, a part of the chain circuit which controls the operation of mechanical register MR9 may be cut out by operating key K4 to the left, and key K6 to the right wih manual switches MS4 and MS5 set to their number 5 contacts. Then with key K10 normal and keys K8 and K9 operated as described above, mechanical register MR9 will register the number of times the circuit under observation was held operated for 55 seconds or longer. It will be observed therefore, that keys K1 to K7 serve to cut out either end of a chain circuit which controls the operation of mechanical register MR9. It is thus possible to obtain a direct reading of how many times a circuit under observation remains operated for 5,555.555 seconds, for example, or if desired, 55 seconds.

FIGS. 8, 6 and 7 show an exemplary embodiment of a traffic data analyzer which automatically reads and analyzes the records of traffic data recorded by the magnetic recorder shown in FIG. 4. The records on the magnetic tape made by the recorder shown in FIG. 4 consist of blank or erased intervals in a track of previously recorded alternating-current signals, the length of the blank or erased intervals being equivalent to the time the circuit under observation was in an operated condition.

The embodiment of traffic data analyzer shown in FIGS. 8, 6 and 7 utilizes an identical counting stage shown in FIGS. 6 and 7 and described above. The reading stage shown in FIG. 8 differs and will now be described in detail. The reading stage shown in FIG. 8 comprises a multihead magnetic tape recorder 73 having a plurality of reading heads 68 and 69. Magnetic tape 40, upon which has been previously recorded the traffic data to be read and analyzed, is wound on spool 66 and 67 and driven past reading heads 68 and 69, in the manner known in the art, by motor M. As mentioned above, the traffic data is recorded on magnetic tape 40 by the so-called "negative recording" method. The signal interval, or the interval of interest which indicates the time the circuit under observation was in an operated condition, is represented by a blank interval erased from a previously recorded signal track on the tape. Reading head 69 is situated adjacent to the record track on tape 40 and reading head 68 is situated adjacent to a pilot track on tape 40. The pilot track on tape 40 is a continuous signal track of the same frequency as recored in the record track but in which there are no erased or blank intervals. Therefore, reading head 68 continuously reads the alternating-current signal in the pilot track which is applied to amplifier-rectifier 71 and gate signal amplifier 72. The output from reading head 69 on the record track is applied to a gating amplifier 70. Gating amplifier 70 comprises an amplifier and a full wave rectifier, the output of the rectifier being utilized to control the grid bias of the amplifier-rectifier 71 and the gated signal amplifier 72. Therefore, whenever current is generated in reading head 69 by an unerased portion of the record track, the gating amplifier 70 applies a negative bias to amplifier-rectifier 71 and the gated signal amplifier 72 to prevent these circuits from conducting. Whenever an erased portion of the record track is encountered by reading head 69, there will be no rectified output from the gating amplifier 70 and the bias on amplifier-rectifier 71 and gated signal amplifier 72 will be restored to normal, allowing them to conduct to activate the counter and send pulses into the counter in the manner described above in connection with FIG. 5. Thus, negative pulses will be received by the counting stages of the traffic data analyzer during the blank interval encountered by the reading head 69 which, as mentioned above, is a measure of the time the circuit under observation was in an operated condition. The counting stages of the traffic data analyzer shown in FIGS. 6 and 7 operate in the manner described hereinbefore.

In the description given hereinbefore, reference has been made to the operated time of a relay or circuit under observation or more precisely to the interval during which a relay or circuit under observation was in an operated condition. It is to be understood that the time that such a relay or circuit under observation is in an unoperated condition can be recorded on a magnetic tape just as well as the time that it is in an operated condition. The description given above has also been directed toward the observation of the operation and release of relays. It is to be further understood that there are many other devices or circuits in which the changes of state or condition may be recorded on a magnetic tape. It is also to be understood that one device may start a recording and another may stop it. Although specific embodiments of this invention have been shown and described, it will be understood that they are but illustrative and that various modifications may be made therein without departing from the scope and spirit of this invention.

What is claimed is:

1. In a traffic data analyzer for analyzing the record of a plurality of occurrences of two successive events for a given period wherein said record comprises a storage medium in which is recorded a plurality of groups of indicia with each of said groups of indicia representing the elasped time between respective occurrences of said two events, the combination comprising reading means for reading said indicia in said storage medium, counting means connected to said reading means for counting said indicia, control means controlled by said reading means for resetting said counting means for each of said groups of indicia read by said reading means and means connected to said counting means and controlled by said control means for indicating the number of said groups of indicia which contain a given number of indicia.

2. The combination of claim 1 in combination with means controlled by said reading means for indicating the total number of said groups of indicia in said storage medium.

3. The combination of claim 2 in combination with means controlled by said counting means for registering a distribution counter of the number of said groups of indicia which contain specific numbers of indicia.

4. A device for analyzing the duration of a periodically alternating signal comprising a counting means for counting each cycle of said signal, means for rectifying said signal and means controlled by said rectifying means for resetting said counting means.

5. In a traffic data analyzer for analyzing a record of the performance of an observed circuit during an observation period wherein said record comprises a magnetic tape with recorded intervals of an alternating signal of known frequency representing the operated time of said observed circuit and blank intervals representing the unoperated time of said observed circuit, the combination comprising magnetic reproducing means adapted to reproduce said alternating signal recorded on said tape, means for driving said tape past said reproducing means, counting means connected to said reproducing means for counting the cycles of said alternating signal recorded on said tape, rectifying means connected to said reproducing means for rectifying said alternating signal recorded on said tape, resetting means controlled by said rectifying means for resetting said counting means at the start of each said recorded interval, settable indicating means connected to said counting means for registering the number of times said observed circuit was operated for longer than a predetermined interval during said observation period.

6. In a traffic data analyzer for analyzing a record of the performance of an observed circuit during an observation period wherein said record comprises a magnetic tape with recorded intervals of an alternating signal of known frequency representing the operated time of said observed circuit and blank intervals representing the unoperated time of said observed circuit, the combination comprising magnetic reproducing means adapted to reproduce said alternating signal recorded on said tape, means for driving said tape past said reproducing means, counting means connected to said reproducing means for counting the cycles of said alternating signal recorded on said tape, rectifying means connected to said reproducing means for rectifying said alternating signal recorded on said tape, resetting means controlled by said rectifying means for resetting said counting means at the start of each said recorded interval, a plurality of settable indicating means, each of said indicating means being settable to represent a predetermined number and means controlled by said counting means for operating each of said indicating means when the number of cycles counted by said counting means in each said recorded interval equals the respective number set in each of said indicating means.

7. The combination of claim 6 wherein said counting means comprises a plurality of stepping tubes, each having ten stepping stages comprising ten transfer cathodes and ten rest cathode alternately arranged in a circular array, a main anode associated with said cathodes in cooperative relationship therewith, a normalizing electrode to enable a main discharge between said main anode and the transfer cathode of the first stepping stage to be initiated and an auxiliary anode adjacent the rest cathode of the tenth stepping stage and defining an auxiliary gap therewith.

8. In a traffic data analyzer for simultaneously analyzing a record of the performance of a plurality of observed circuits during an observation period wherein said record comprises a magnetic tape with a plurality of record tracks each associated with one of said observed circuits and each of said record tracks comprises recorded intervals of an alternating signal of known frequency representing the operated time of the observed circuit associated therewith and blank intervals representing the unoperated time of said observed circuit associated therewith, the combination comprising a plurality of magnetic reproducing means associated with respective record tracks on said magnetic tape and adapted to reproduce the alternating signal recorded therein, means for driving said tape past said plurality of reproducing means, a plurality of counting means connected to respective ones of said reproducing means for counting cycles of the alternating signal recorded in the respective record tracks on said tape, a plurality of indicating means connected to respective ones of said counting means and controlled by the reproducing means associated therewith for registering the number of cycles of said alternating signal recorded in the associated record track on said tape.

9. The combination defined in claim 8 wherein said recorded intervals of an alternating signal of known frequency correspond to the respective intervals that said device was in its off state and wherein said means responsive to said reproduced alternating signal comprises a source of alternating signal of said known frequency, counting means operative to count the cycles of said alternating signal from said source, and means controlled by said reproduced alternating signal for connecting said source to said counting means during the blank portions of said record between said recorded intervals.

10. The combination defined in claim 9 wherein said means controlled by said reproduced alternating signal for connecting said source to said counting means comprises rectifier means for rectifying said reproduced alternating signal and gating means connected to said source of alternating signal and controlled by said rectifier means for gating said alternating signal from said source to said counting means during the blank portions of said record between said recorded intervals.

11. The combination of claim 9 wherein said source of alternating signal of known frequency comprises a track on said magnetic tape in which said alternating signal has been previously recorded and an associated magnetic reproducing means for magnetically reproducing said alternating signal.

12. A traffic data analyzer for analyzing the performance of an observed circuit during an observation period comprising in combination, a magnetic tape record of the operation of said observed circuit for said observation period, said record comprising recorded intervals of an alternating signal of known frequency representing the unoperated time of said observed circuit and blank intervals representing the operated time of said observed circuit, magnetic reproducing means adapted to reproduce said alternating signal recorded on said tape, means for driving said tape past said reproducing means, a source of alternating signals of known frequency, counting means adapted to count the cycles of said alternating signals from said source, means controlled by said reproducing means for connecting said source of alternating signals to said counting means during the blank intervals of said record on said tape, indicating means controlled by said counting means for registering the number of cycles counted by said counting means during said blank intervals, rectifying means connected to said source of alternating signals, further means controlled by said reproducing means for controlling said rectifying means to rectify said alternating signals during said blank intervals of said record on said tape and resetting means controlled by said rectifying means for resetting said counting means at the start of each said blank interval.

13. The combination of claim 12 wherein said further means controlled by said reproducing means for controlling said rectifying means comprises a further rectifying means connected to said reproducing means, a gating means connected to said source of alternating signals and said rectifying means and controlled by said further rectifying means to rectify said alternating signals during said blank intervals of said record on said tape.

14. The combination of claim 12 in combination with settable indicating means connected to said counting means for registering the number of times said observed circuit was operated for longer than a predetermined interval during said observation period and means controlled by said rectifying means for registering the total number of times said observed circuit was operated during said observation period.

15. The combination of claim 12 in combination with a plurality of settable indicating means, each of said indicating means being settable to represent a predetermined number and means controlled by said counting means for operating each said indicating means when the number of cycles counted by said counting means during each said blank interval equals the respective number set in each of said indicating means.

16. In a traffic data analyzer for analyzing a record of the states of a two-state device during a given observation period wherein said record comprises a magnetic tape having recorded intervals of an alternating signal of known frequency corresponding to the respective intervals that said device was in one of its two states, the combination comprising reproducing means for reproducing said alternating signal recorded on said tape, means responsive to said reproduced alternating signal for determining the duration of each interval that said device was in one of its two states, and means controlled by said last named means for determining the total time that said device was in said one of its two staes during said observation period.

17. The combination defined in claim 16 in combination with means responsive to said reproduced alternating signal for determining the number of times said device was in said one of its two states during said observation period.

18. The combination defined in claim 17 in combination with settable means controlled by said means responsive to said reproduced alternating signal for determining the number of times said device was in said one of its two states for at least a predetermined period.

References Cited in the file of this patent

UNITED STATES PATENTS

| | | |
|---|---|---|
| 2,302,002 | Bryce | Nov. 17, 1942 |
| 2,540,654 | Cohen et al. | Feb. 6, 1951 |
| 2,600,817 | Victoreen | June 17, 1952 |
| 2,633,402 | Fleming | Mar. 31, 1953 |
| 2,674,728 | Potter | Apr. 6, 1954 |
| 2,769,595 | Bagley | Nov. 6, 1956 |